United States Patent [19]
Hawk

[11] Patent Number: 6,029,716
[45] Date of Patent: Feb. 29, 2000

[54] TIRE INFLATER METHOD AND APPARATUS

[75] Inventor: Homer J. Hawk, Racine, Wis.

[73] Assignee: MTD Products Inc, Cleveland, Ohio

[21] Appl. No.: 09/222,125

[22] Filed: Dec. 29, 1998

[51] Int. Cl.[7] .................................................. B65B 31/00
[52] U.S. Cl. .................................. 141/38; 141/4; 141/9; 141/54; 141/67; 141/94; 141/129; 141/164; 141/168; 141/177; 141/181; 141/192; 141/284; 141/370; 157/1.1
[58] Field of Search .............................. 141/4, 9, 38, 54, 141/67, 83, 94, 100, 102, 105, 129, 163, 164, 168, 177, 181, 192, 234, 250, 270, 284, 311 R, 368–370; 157/1.1, 1.17, 1.24, 1.2, 14, 21

[56] References Cited

U.S. PATENT DOCUMENTS 3,814,163  6/1974  Charles et al. .......................... 157/1.1
5,035,274  7/1991  Kinnick et al. .......................... 157/1.1

*Primary Examiner*—Steven O. Douglas
*Assistant Examiner*—Timothy L. Maust
*Attorney, Agent, or Firm*—Emerson & Associates; Roger D. Emerson; Timothy D. Bennett

[57] ABSTRACT

A tire inflating method and apparatus, allowing inflation of different sized tires without changing over a tire inflation device. The tire inflation device has two chambers, an inner chamber and an outer chamber. The inner chamber is within the outer chamber and extends downwardly when a smaller sized rim is being used. The tire inflation device has a linear transducer, with a magnetic ring, that determines the height of the tire inflation head and knows when to shut off inflation. A method of inflating tires without changing over an inflation device is also provided. The method includes the steps of photo switches detecting the size of the rim being used, an inflation head adjusting to a corresponding size of the tire rim, and the inflation head inflating the tire and rim to a specified pressure.

15 Claims, 11 Drawing Sheets

6,029,716

TIRE INFLATER METHOD AND APPARATUS

BACKGROUND OF THE INVENTION

I. Field of the Invention

This invention pertains to the art of methods and apparatuses for tires, and more particularly, to method and apparatuses for inflating tires.

II. Description of the Related Art

Methods and apparatuses for inflating tires are well known in the art. One known method of tire inflation is to adjust a tire inflater to inflate one particular size of tires. This has proven to be an effective method for inflating tires as long as the tires, and corresponding rims, do not vary in size. However, if the tire sizes vary, known inflaters must be re-calibrated for each new tire size. Typically, this requires that an inflation chamber be adjusted or replaced to accommodate the appropriate inflation volume. This adjustment causes a loss of production time for the inflater and an increase in maintenance time and cost. To accommodate this limitation, time and energy must be exerted in the factory to sort tires according to size before they are inflated. Thus, known inflaters are inadequate to provide efficient inflation for tires and rims that vary randomly in their size as they proceed through the inflation process.

The present invention contemplates a new and improved tire inflation method and apparatus that allows inflation of tires of different size, with no need to adjust or recalibrate the tire inflater. Thus, this invention is simple in design, effective in use, and overcomes the foregoing difficulties and others while providing better and more advantageous overall results.

SUMMARY OF THE INVENTION

In accordance with one aspect of the present invention, a new and improved tire inflater machine includes a gas source, an inflation head, sensing means, and a chamber adjusting means for selectively adjusting the inflation head. The preferred sensing means is a series of photo switches that determine the size of rim being used.

In accordance with another aspect of the invention, the inflation head has first and second chambers flanges that form first and second concentric chambers. The first chamber flange extends downwardly within the second chamber flange to inflate a smaller sized tire.

In accordance with yet another aspect of the invention, the tire inflater machine includes a linear transducer, the transducer having a magnetic ring. The magnetic ring measures the height of the inflation head. When the inflation head reaches a predetermined height, the linear transducer sends a signal to a logic controller thereby indicating that the tire has been fully inflated.

According to yet another aspect of the invention, the tire inflater machine has a clamp assembly, multiple rollers, and a tire locator. The clamp assembly has first and second grooves corresponding to different tire rim sizes. The multiple rollers adjust according to the size of rim being used, and push the tire down onto the rim. The tire locator raises the tire and rim assembly up to meet the tire inflation device.

One advantage of the present invention is that the tire inflater machine automatically adjusts to inflate different sized tire.

Another advantage of the current invention is that tires no longer have to be sorted for size before they are inflated.

Another advantage of the current invention is that multiple photo switches do not need to be used to sense the height of the inflater device.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification that follows and will be illustrated in the accompanying drawings, which form a part of this disclosure and wherein.

DESCRIPTION OF THE PREFERRED EMBODIMENT

Figure 8:
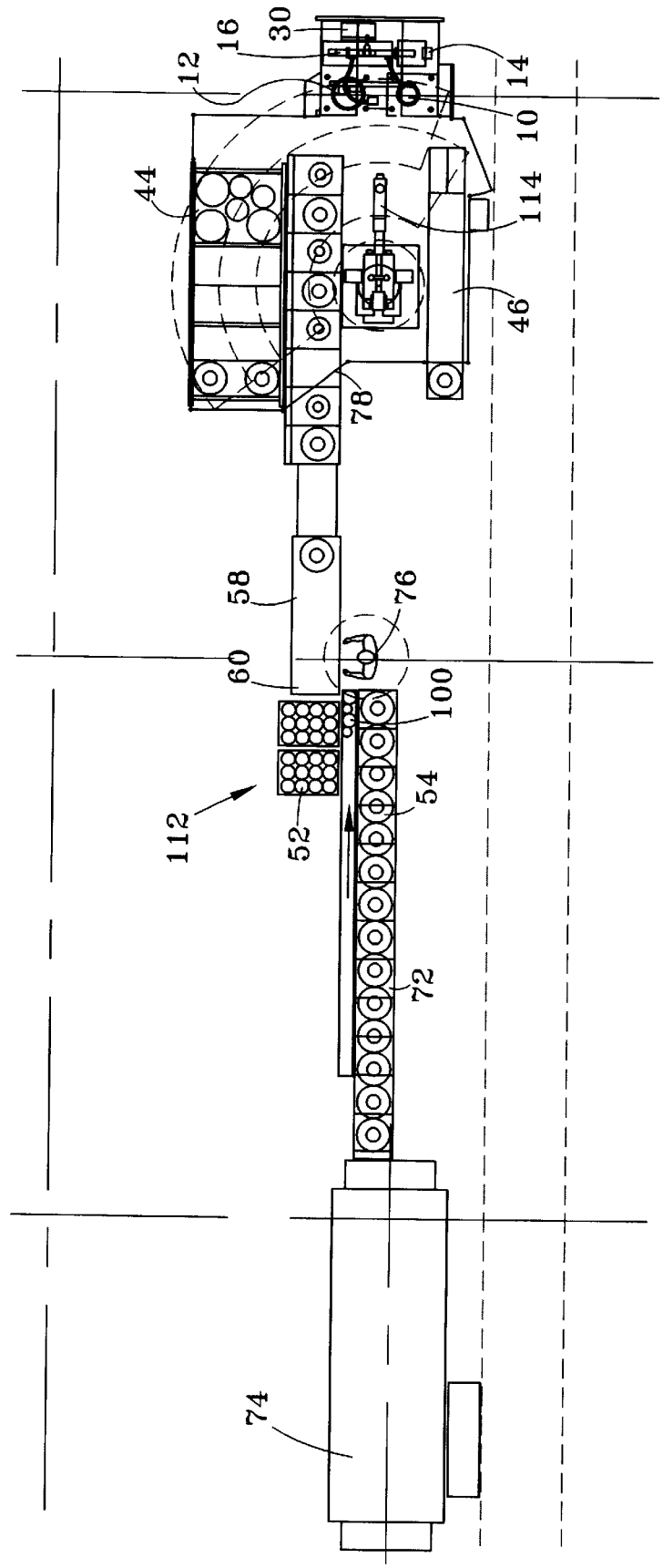
FIG. 8 is a top layout view of the entire tire assembly and testing process showing the oven, conveyors, the tire inflater machine, and the tire leak detection assembly.

Referring now to the drawings, which are for purposes of illustrating a preferred embodiment of the invention only, and not for purposes of limiting the same, FIG. 8 shows an inventive tire inflater machine 58 used in a manufacturing process. In the process shown, tires 54 taken from a delivery vehicle (not shown) may be heated in an oven 74 to properly expand the tires 54 due to shipment wrapping and are then moved by a first conveyor 72 to the inflater machine 58 where the tires 54 are inflated to corresponding rims 100. By "inflated to" the applicant means sealing the tire 54 to the rim 100 by means of inflation. After inflation, the tires 54 (each properly mounted to a rim 100) are moved by a second conveyor 78 to a robotic arm 114 where they are picked up and placed within a first vacuum chamber 10 to determine if the tires 54 have any leaks. If the tires 54 do not have any leaks they are placed onto a third conveyor 44 for further processing. If the tires 54 are found to have leaks they are placed onto a fourth conveyor 46 for inspection.

With reference now to FIGS. 3, 4, 8, and 9, the inventive tire inflater machine 58 includes a clamp assembly 60 for use in holding and measuring the size of the appropriate rim 100, a tire locator 96 for maintaining the tire 54 and corresponding rim 100 in the correct position, a gas mixer 90 for mixing air and helium for use as an inflation gas, and an inflation head 50 used to inflate the tire 54 with the inflation gas.

Figure 3:
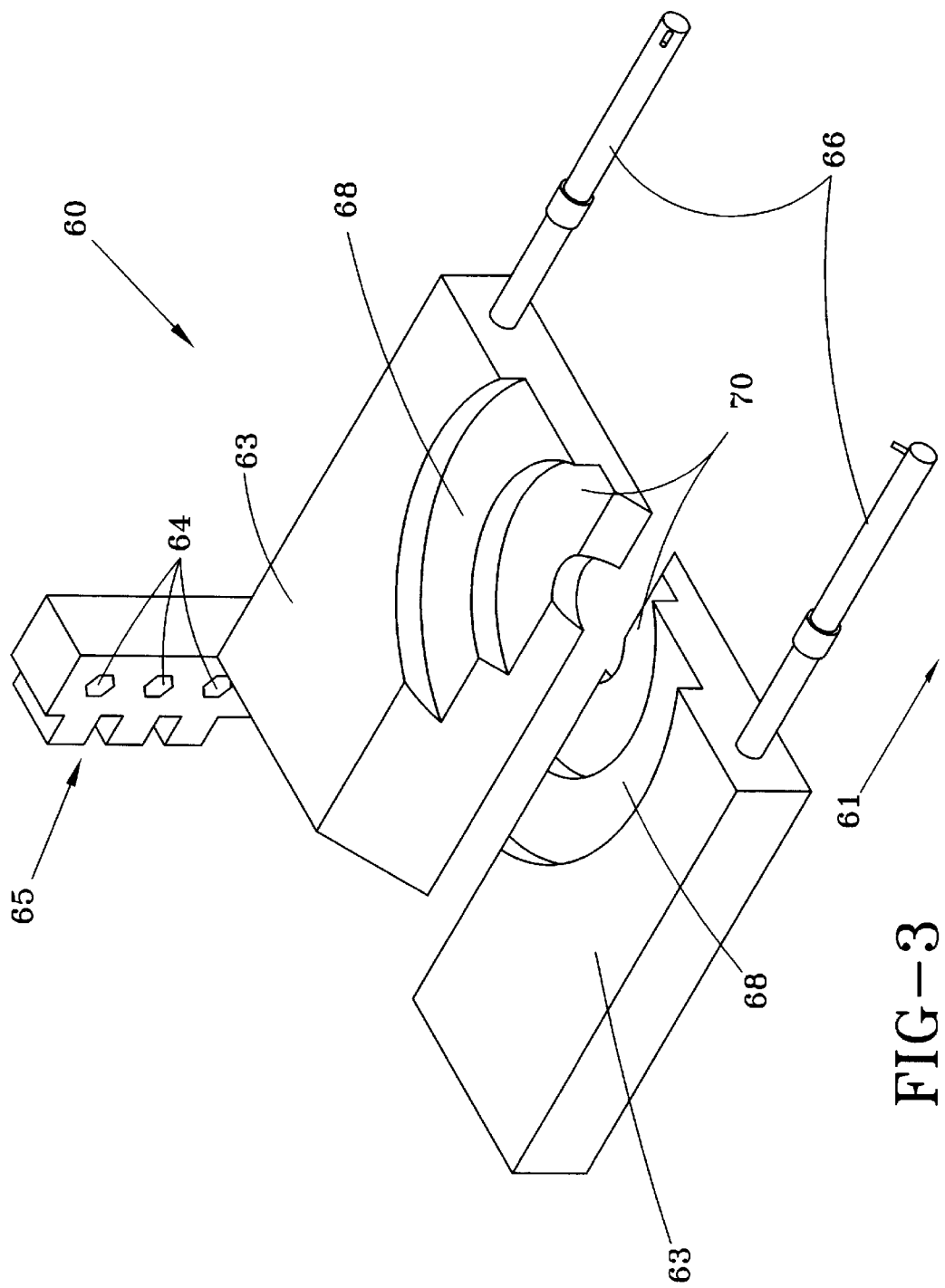
FIG. 3 is a perspective view of the clamp assembly showing the photo switches, the first and second grooves, and the guide arms.
Figure 9:
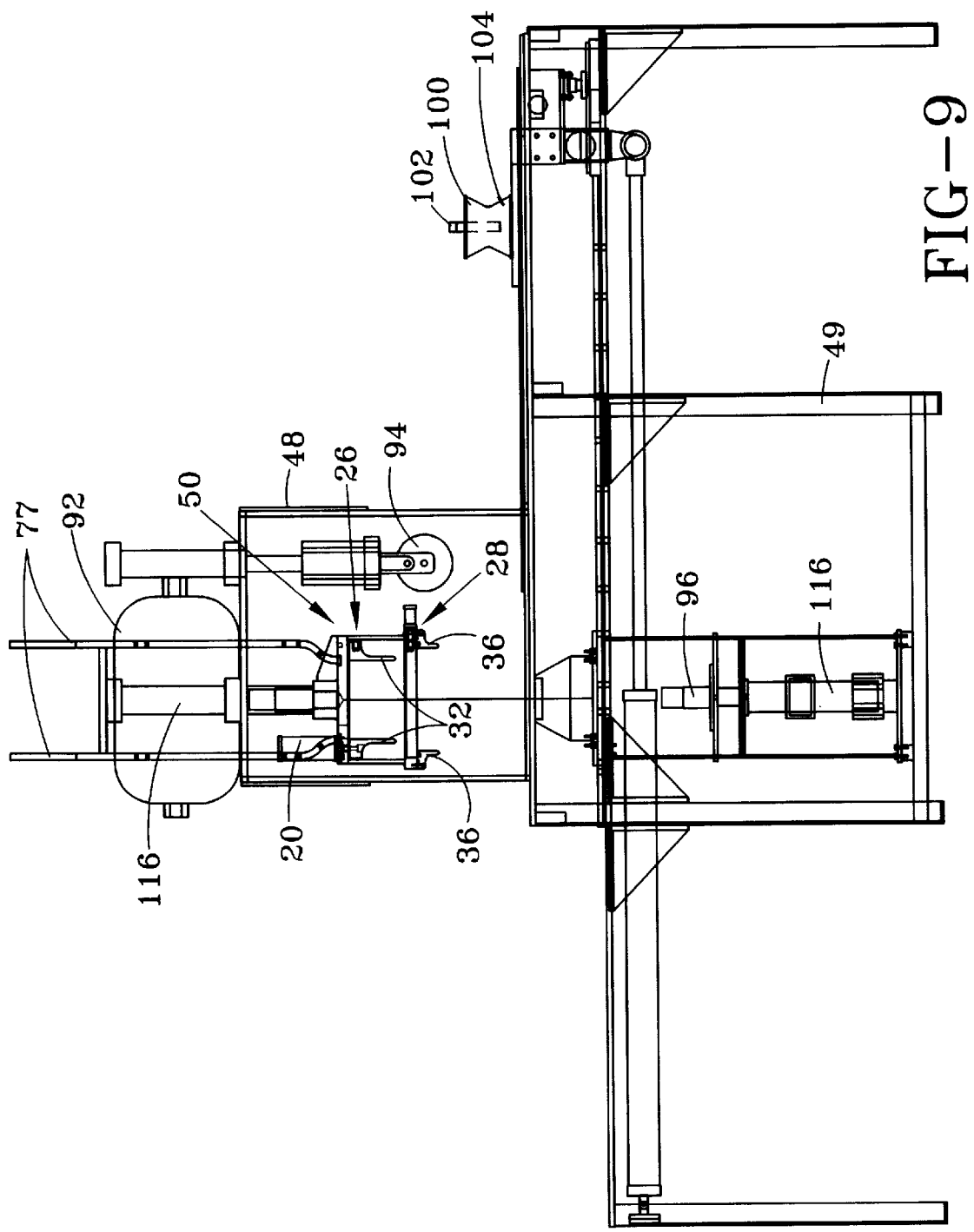
FIG. 9 is a front view of the tire inflater machine showing the inflation head, the surge tank, the tire locator, the first and second chambers, and the roller.
Figure 10:
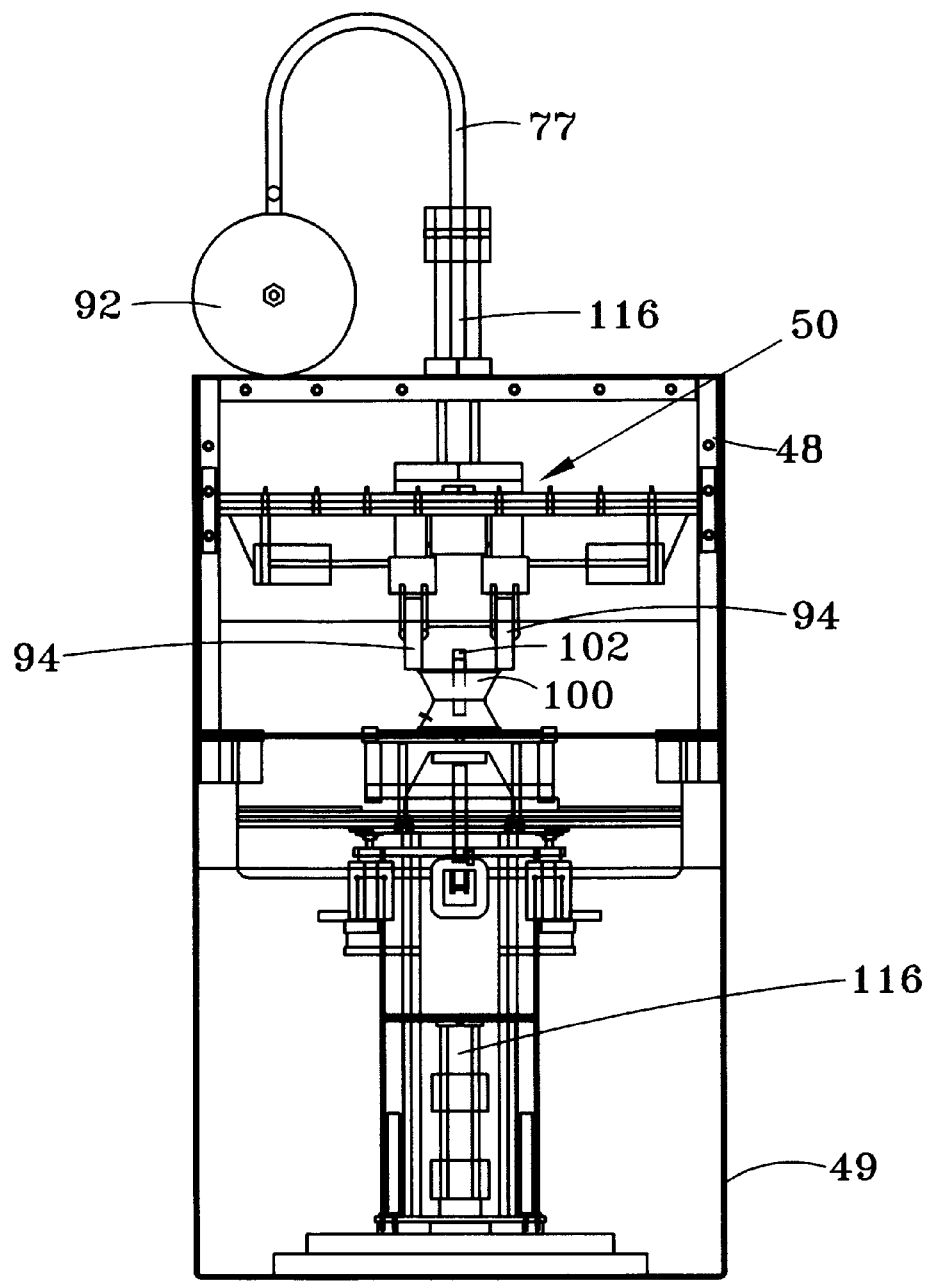
FIG. 10 is a side view of the tire inflater machine.

With reference now to FIGS. 3, 8, and 9, the clamp assembly 60 includes a pair of adjacent plates 63 having first and second grooves 68, 70, that are preferably concentric and are used to hold, or clamp, the tire rim 100. Each of the first and second grooves 68, 70 receive a particular size of rim 100. Thus, the plates 63, as shown, can selectively receive two sizes of rim 100. Of course, additional grooves could be provided to permit additional sizes of rim 100 to be used. Once a tire rim 100 is clamped by the plates 63, the plates 63, along with the rim 100, and the appropriate tire 54, are moved along a pair of rails (not shown) in direction 61 toward the tire locator 96. A pair of guide arms 66 extend from the plates 63 as shown, and are used to move any remaining tires 54 out of the way of the oncoming clamp assembly 60. Sensing means 65 is mounted adjacent to the plates 63 for use in sensing, or measuring, the size of the particular rim 100 being held in the clamp assembly 60. Although the sensing means 65 can be of any type chosen with sound judgment, in the preferred embodiment, the sensing means 65 includes a plurality of photo switches 64, preferably aligned in a stoplight configuration, as shown. The photo switches 64 are electrically connected to some type of programmable logic controller (not shown) as commonly known in the art.

Figure 5:
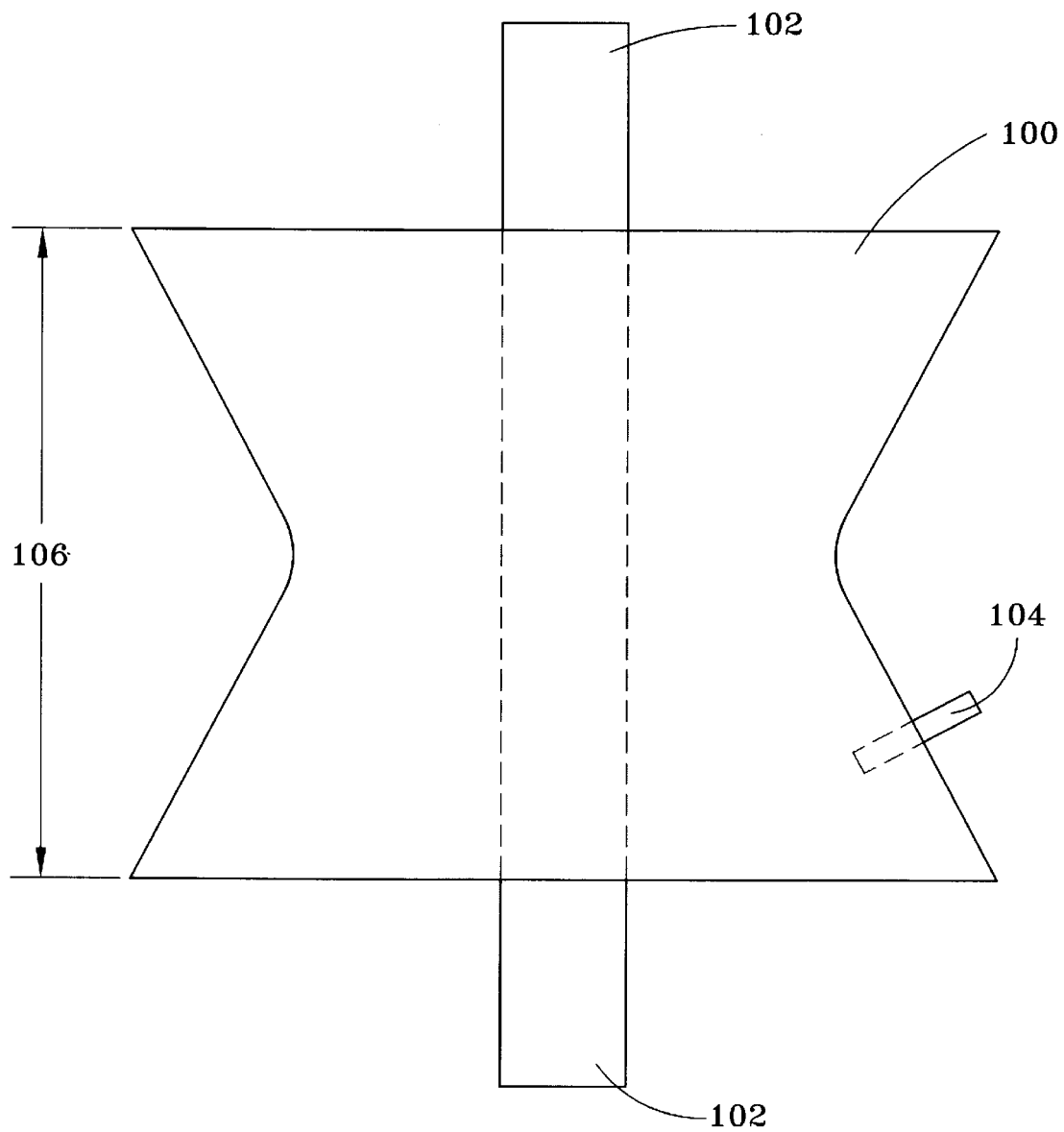
FIG. 5 is a side view of a tire rim showing the axle hub, the width of the rim, and the valve stem.
Figure 6:
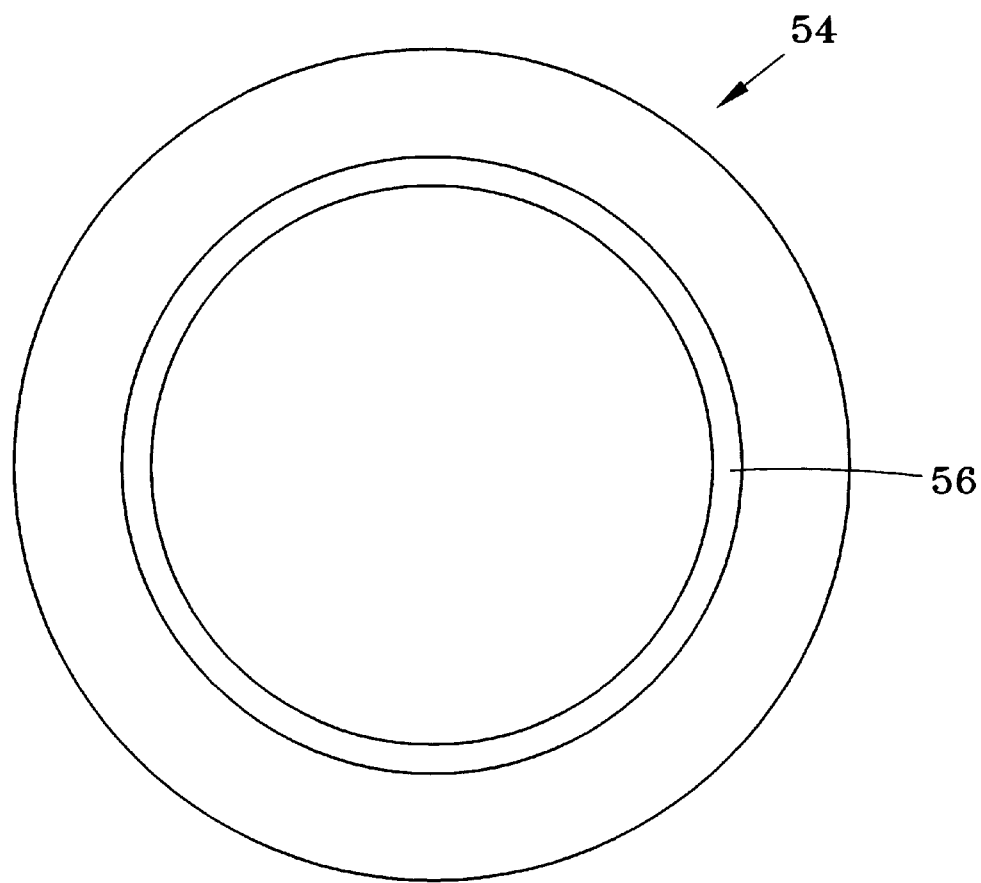
FIG. 6 is a top view of the tire showing the tire bead area.

With reference now to FIGS. 5, 6, and 9–11, the particular tire 54 to be inflated with this invention can be any tire chosen with sound engineering judgement. The rim 100 sized to correspond with the tire 54, as shown in FIG. 5, has a width 106, and includes a valve stem 104. The rim 100 may also include an axle hub 102. A puck 98 is placed on the rim 100 to prevent the sharp edge of the rim 100 from cutting a tire bead area 56. The tire bead area 56 is the area of the tire 54 that seals the tire 54 to the rim 100. The tire bead area 56 is lubricated with soap and the tire 54 is placed over top of the rim 100. The puck 98 is preferably a hard cylindrical disk with a hole to receive the axle hub 102. The puck 98 can be made of any material chosen using sound engineering judgement. As the tire 54 and rim 100 approach the tire locator 96, a pair of rollers 94 push the tire 54 over the rim 100. The rollers 94 are supported by an upper frame member 48 and are freely rotatable about a horizontal axis. The tire locator 96 is secured to a lower frame member 49 in a vertical position directly underneath the later-to-be-described inflation head 50. The tire locator 96 is used to properly align the tire 54 and rim 100 with the inflation head 50. The tire locator 96 is controlled by a pneumatic lift cylinder 116, but could be moved by any means chosen with sound engineering judgment. The lift cylinder 116 used in the preferred embodiment is well known in the art, and therefore will not be discussed in detail.

Figure 4:
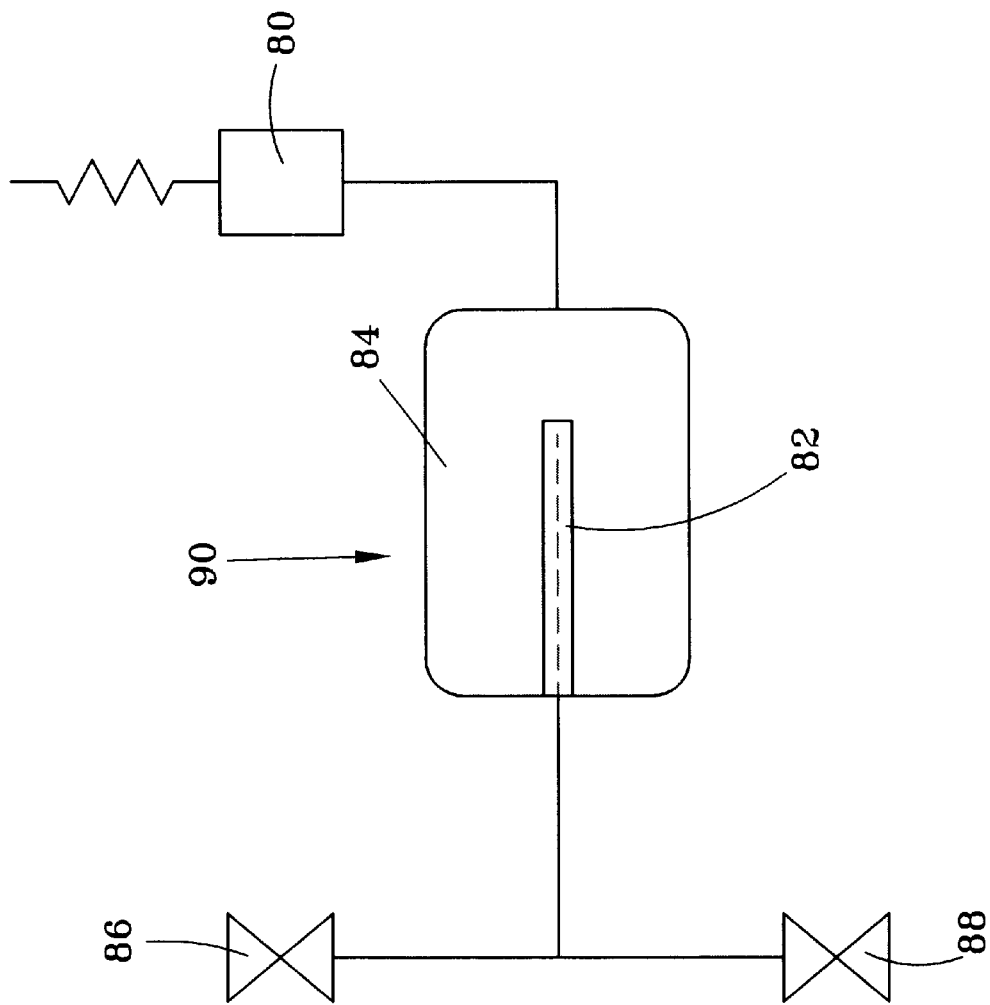
FIG. 4 is a schematic representation of the gas mixer showing the diffusion tube, the pressure transducer, the air valve, the surge tank, and the helium valve.

With reference now to FIGS. 4 and 8, the equipment and methods for obtaining the gas to be inflated into the tires 54 will now be discussed. Any inflation gas chosen with sound engineering judgment can be used with the current invention. In the preferred embodiment a gas mixer 90 mixes air and helium to create the inflation gas. The helium may be stored in tanks 52 near the tire inflater machine 58 as shown. The gas mixer 90, as shown in FIG. 4, is contained within the surge tank 92. An air valve 86 communicates, using appropriate piping (not shown) with a source of compressed air such as an air compressor (not shown) and selectively permits compressed air to fill in the surge tank 92. Similarly, a helium valve 88 communicates, using appropriate piping (not shown) with the tanks 52 and selectively permits helium to fill the surge tank 92.

With continuing reference to FIG. 4, a diffusion tube 82, having a plurality of small holes, may be placed within the surge tank 92 and is used to permit the air and helium to enter the surge tank 92. The small holes constrict the flow of gas, thereby increasing the inlet velocity of the gas and assisting in the mixing of the air and helium within the surge tank 92. Any gas mixer 90 is acceptable as long as it is chosen using sound engineering judgment. The preferred gas mixer 90 is base unit P/N 925-102 produced by Vacuum Instruments Corporation. The surge tank 92 also communicates, using appropriate piping (not shown), with a surge tank 92. A pressure transducer 80 determines the pressure within the surge tank 92 and is operatively connected to the programmable logic controller (not shown) as commonly known in the art.

With reference now to FIGS. 1, 2, 8, and 9, the invention also includes chamber adjusting means, which comprises the programmable logic controller, first and second inflation chambers 26, 28, and a lift cylinder 116. The inflation head 50 is used to quickly transfer the inflation gas from the surge tank 92 into the tire 54. The lift cylinder 116 connects the inflation head 50 to the upper frame member 48 and is used to selectively raise and lower the inflation head 50. Preferably, the lift cylinder 116 is a hydraulic cylinder but this invention would work equally well if other means were used to raise and lower the inflation head 50, such as a pneumatic cylinder. Appropriate piping 77 connects the surge tank 92 to openings 29 in the inflation head 50 so that the inflation gas can be transferred as required. The inflation head 50 includes a bell weldment 31 as well as first and second chamber flanges 32, 36, aligned axially. The chamber flanges 32, 36 are preferably ring-shaped, having first and second diameters D1, D2 respectively, and form the walls of cylindrically-shaped first and second inflation chambers 26, 28, respectively. As shown, D2 is larger than D1, thereby permitting the second inflation chamber 28 to fit the bead area 56 of a larger size tire 54 and to deliver more inflation gas than the first inflation chamber 26. Thus, the inflation head 50, as shown, can selectively deliver either one of two amounts of inflation gas, at two diameter sizes, to the tire 54. Of course additional inflation chambers could be formed to permit additional amounts of inflation gas, and additional diameter sizes, to be provided to the tire 54.

Figure 1:
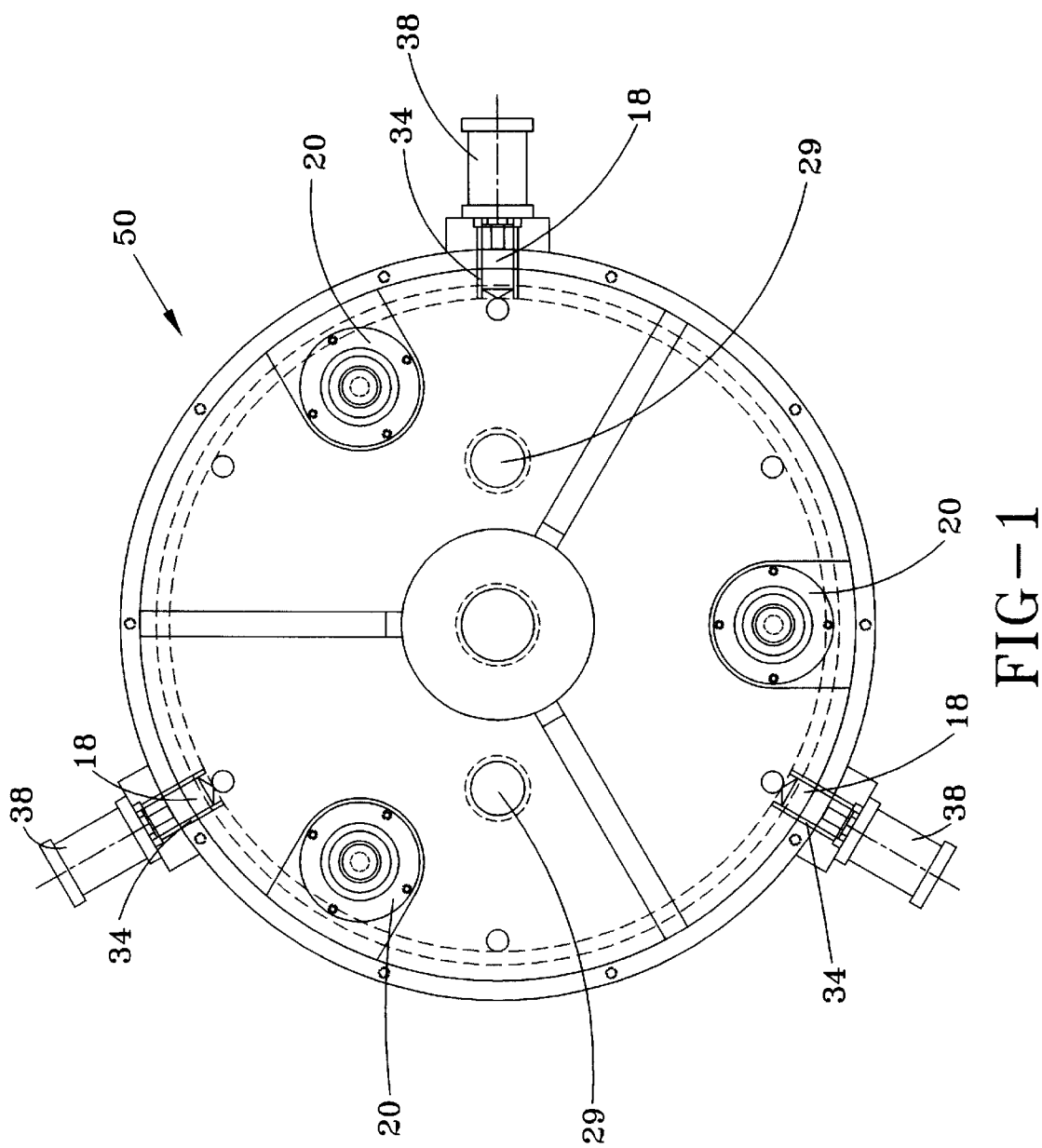
FIG. 1 is a top view of the inflation head showing the shot pins, the shot pin cylinder, and the air cylinder.
Figure 2:
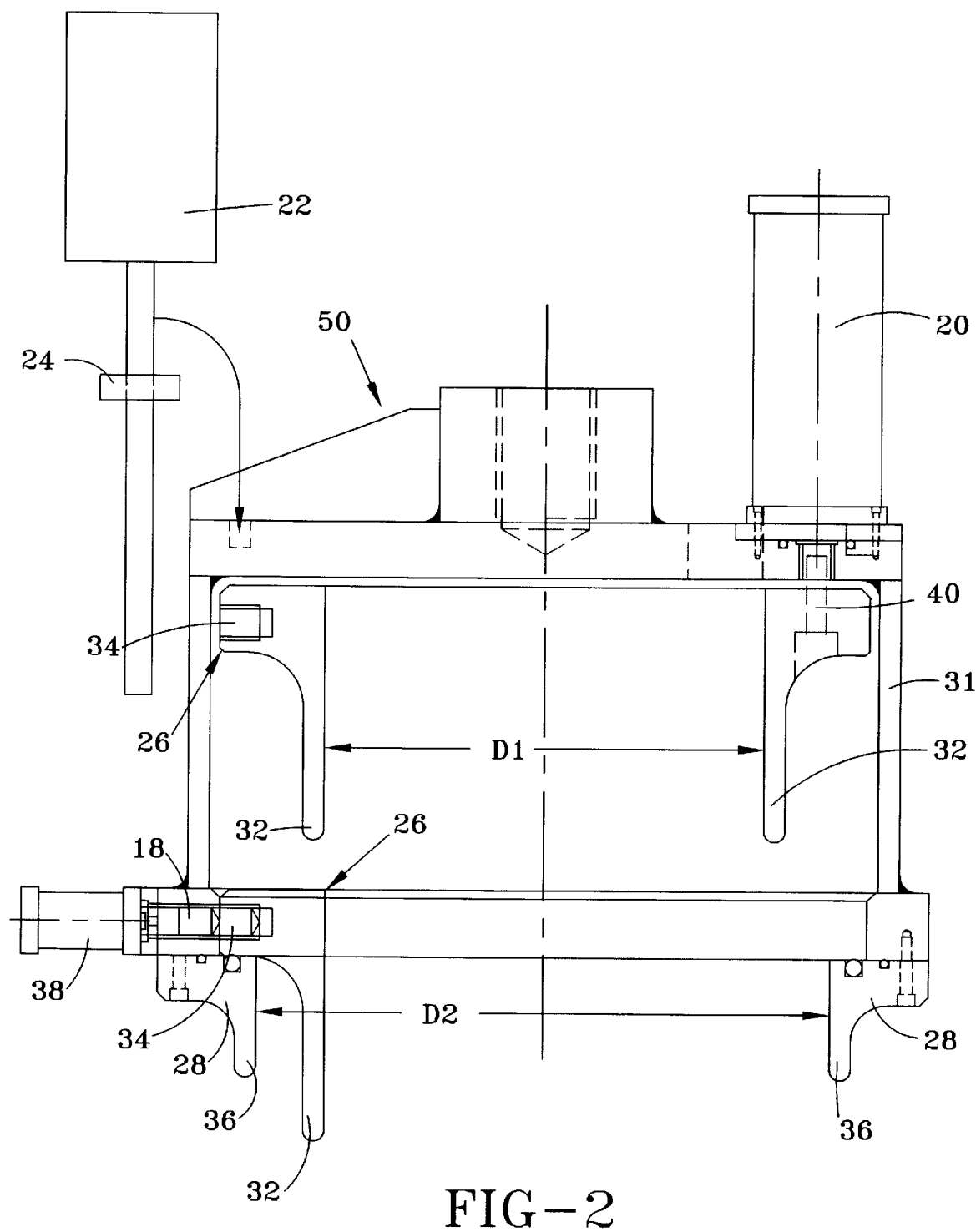
FIG. 2 is a side view of the inflation head showing the bell weldment, the first chamber, the second chamber, the air cylinder, the O-ring grooves and the linear transducer.
Figure 7:
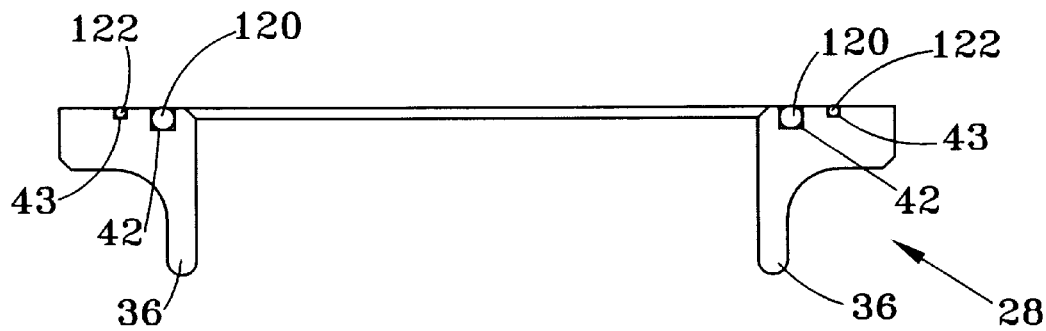
FIG. 7 is a side view of the first chamber showing the O-rings and the O-ring grooves.
Figure 12:
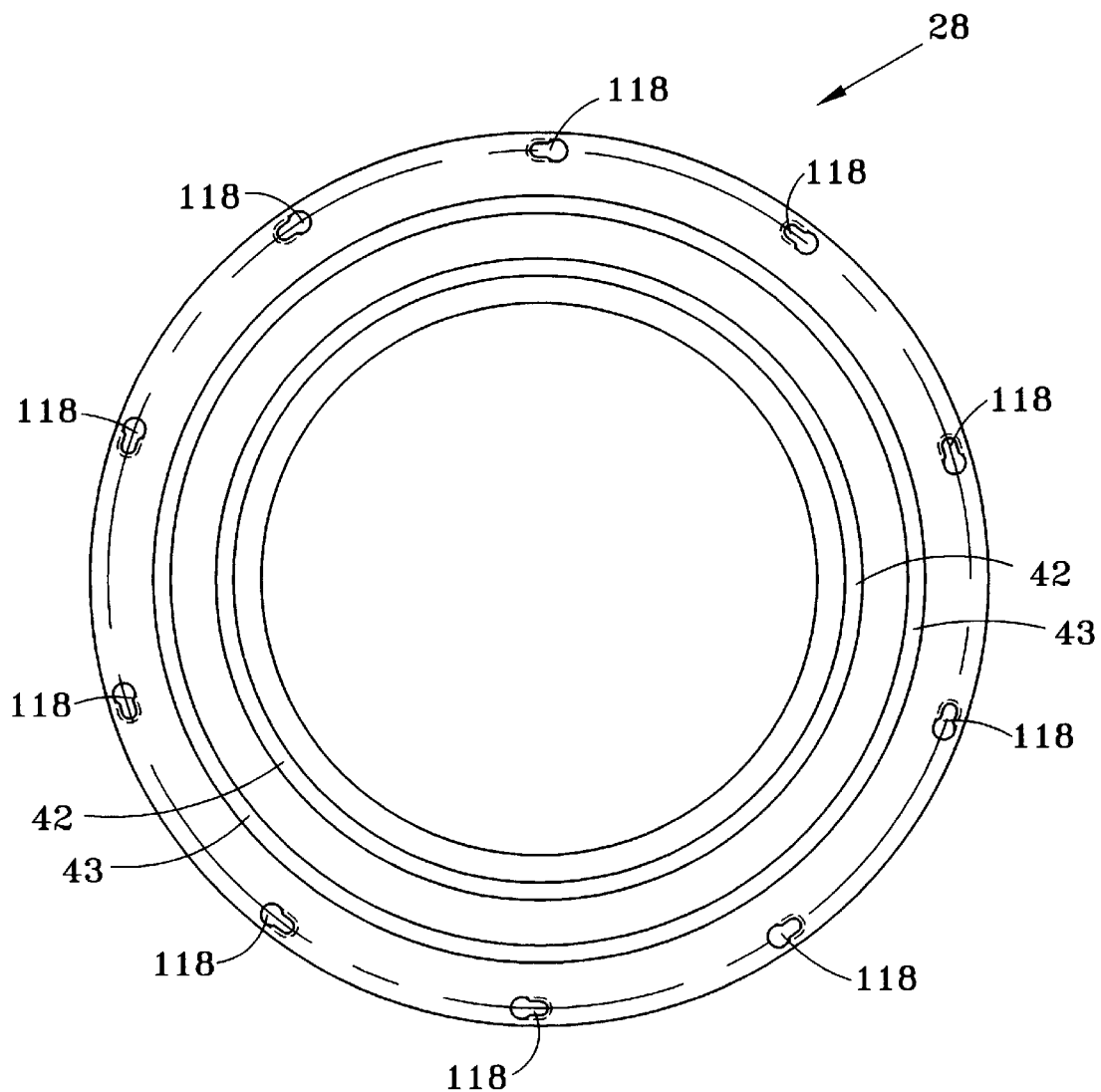

With reference to FIGS. 2, 7, and 12, the second chamber flange 36 is fixedly connected to the bottom of the bell weldment 31 as shown. Preferably the top surface of the second chamber flange 36 includes inner and outer grooves 42, 43 and a plurality of teardrop-shaped apertures 118. Bolts (not shown) can be inserted through the apertures 118 and into the bottom of the bell weldment 31. The teardrop shape permits the bolts to be threaded into the bell weldment 31 before the second chamber flange 36 is connected. Next, the second chamber flange 36 is placed such that the bolts are received by the wider diameter portions of the apertures 118. The second chamber flange 36 is then rotated until the bolts are received within the narrower diameter portions of the apertures 118 where the bolts may then be tightened, thereby securing the second chamber flange 36 to the bell weldment 31. The inner and outer grooves 42, 43 are used to receive first and second O-rings 120, 122, to provide a sealing relationship, thereby preventing inflation gas from escaping from the inflation head 50. This method of sealing is the preferred embodiment only. Any means of sealing, using sound engineering judgment, may be used. The second O-ring 122 provides a seal between the second chamber flange 36 and the bell weldment 31. Similarly, the first O-ring 120 provides a seal between the second chamber flange 36 and the first chamber flange 32 when the first chamber flange 32 is lowered.

With reference now to FIGS. 2 and 7–9, when the first inflation chamber 26 is used to inflate the tire 54, the first chamber flange 32 is lowered by at least one air cylinder 20 into the position shown in the lower portion of FIG. 2. The air cylinder 20 is mounted to the bell weldment 31 as shown. Preferably, the invention includes a plurality of air cylinders 20. Most preferably, three air cylinders 20 are used to provide optimum control. The first chamber flange 32 is lowered into a sealing relationship with the second O-ring 122. To secure the first chamber flange 32 into this position, at least one shot pin cylinder 38 is extended, thereby forcing a shot pin 18 into a shot pin receptor 34 within the first chamber flange 32. Preferably three shot pin cylinders 38, with corresponding pins 18 and receptors 34 are used. This provides optimum securement of the first chamber flange 32 into position for inflation. To raise the first chamber flange 32, it is only necessary to move the shot pins 18 out of the shot pin receptors 34, with the shot pin cylinders 38, and then lift the first chamber flange 32 with the air cylinders 20. A linear transducer 22, physically connected to the upper frame member 48, and electrically connected to the programmable logic controller, may include a magnetic ring 24 and is used to determine the vertical position of the inflation head 50. Any currently known transducers chosen with sound engineering judgment can be used with this invention.

With reference to FIGS. 3, 5, 6, 8, and 11, a typical manufacturing layout for the inventive process is shown. The foregoing FIGURES show where the tires 54 are unloaded from the delivery truck (not shown). The tires 54 are placed on a third conveyor (not shown), and go through the oven 74. The oven 74 is heated to between 150° F. and 220° F., depending on the condition of the tires 54, then the tires 54 are heated for about 10 minutes causing the tires 54 to expand. Typically, the tires 54 have been compressed due to the bundling process on the delivery truck. The tires 54 then pass out of the oven 74 and onto a first conveyor 72. Next, each tire 54 proceeds down first conveyor 72 to the tire inflater machine 58. A puck 98 is placed on top of the rim 100, prior to the tire 54 being fitted on the rim 100, to prevent the sharp edges of the rim 100 from cutting the tire bead area 56. The tire bead area 56 is lubricated with soap and the tire 54 is placed over top of the rim 100. FIGS. 3 and 8 show the clamp assembly 60 and the photo switches 64. The photo switches 64 sense the tire rim 100 and read a width 106 of the tire rim 100. The photo switches 64 send a message to a programmable logic controller (not shown) which communicates to the tire inflater machine 58 which tire rim size is being used. The clamp assembly 60 closes onto the tire rim 100 and secures the rim 100 with either first groove 68, or second groove 70, depending on the size of the tire rim 100. (As noted above, the clamp assembly 60 could be modified to include as many tire sizes as desired). The clamp assembly 60 then moves in a forward direction 61 and the guide arm 66 moves any previous tire 54 out of the way of the oncoming clamp assembly 60. The tire 54 is then moved into the tire inflater machine 58.

With reference now to FIGS. 1, 2, and 7–9, the operation of the tire inflater machine 58 will now be described. FIG. 2 shows the inflation head 50. When the programmable logic controller (not shown) reads the size of the rim 100 and sends the message to the tire inflation head 50, and to the roller 94, both the inflation head 50 and the roller 94 adjust according to the size of the tire rim 100. Once the tire 54 has passed into the inflation head 50, the air cylinder 20 pushes a piston 40, which drives the inflation head 50 toward the tire 54. If a smaller tire rim 100 is used, then the first chamber flange 32 extends downward and comes into sealing relationship with the second chamber flange 36. This sealing relationship, formed using the inner and outer O-rings 120, 122 in the inner and outer O-ring grooves 42, 43, creates an airtight seal between the first and second chambers 26, 28. As this sealing relationship occurs, the shot pin cylinders 38 drive the shot pins 18 into the shot pin receptors 34 on the first chamber flange 32.

As shown in FIGS. 2, 4, 8, and 9, the pressure transducer 80 reads the amount of pressure in the surge tank 92 and opens the helium valve 88, and allows in helium as required. In one application, for example, helium is added to achieve 10% per volume in the surge tank 92. Once the pressure transducer 80 reads the proper pressure for 10% volume of helium, the pressure transducer 80 shuts off the helium valve 88. The pressure transducer 80 then signals the PLC to open the air valve 86 allowing the air to fill in the surge tank 92. The surge tank 92 then fills the first chamber 26 with the inflation gas mixture to the appropriate pressure. In one application, for example, the surge tank 92 is filled to 60 pounds per square inch (psi) using the 90% air and 10% helium by volume inflation gas. In the preferred embodiment, "commercial grade helium" is used. By "commercial grade helium" it is meant helium that is 96–98% pure. The inflation head 50 then inflates the tire 54 with 20 psi. The air pressure in the inflation head 50 is forced into the tire 54 around the rim 100, and the air pressure seals the tire 54. The process is called "seating the bead." When the inflation head 50 inflates the tire 54, the pressure of the inflation causes the inflation head 50 to raise upward. The magnetic ring 24 senses the rise in height of the inflation head 50 and communicates to the controller that the tire 54 has been inflated and that inflation can be stopped. The tire inflater machine 58 is fitted with an exhaust pipe (not shown) for venting any excess helium that may have leaked from the inflation head 50, or the tire 54. Any helium that leaked out is vented out the exhaust pipe to prevent any interference with a spectrometer 30 detecting helium leaks in the tire 54.

Figure 11:
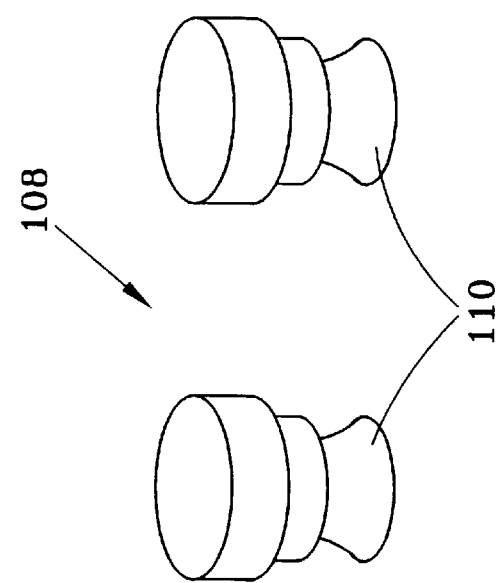
FIG. 11 is a perspective view of the tire inflater machine, showing the "pick and place" system, including the puck, the venturi pump system, and suction cups; and, FIG. 12 is a top view of the second chamber flange showing the inner and outer O-ring grooves and the teardrop-shaped apertures.
Figure 11:
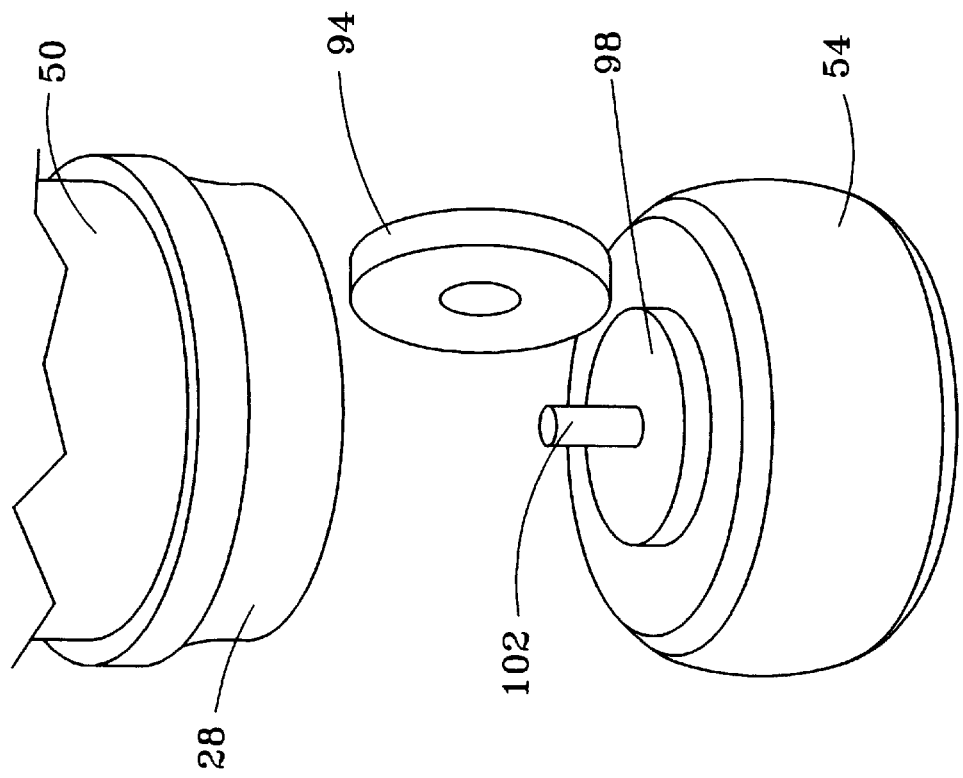

With reference now to FIGS. 8 and 11, once the tire 54 has been inflated, a "pick and place" system (not shown), using a Venturi pump 108 and suction cups 110, picks up the puck 98 and recycles the puck 98 back to an operator 76 to be placed on another rim 100. The Venturi pump 108 and suction cups 110 of the "pick and place" system are well known in the art and will not be described in detail. The tire 54 then passes on to the second conveyor 78. The tire 54 is then picked up from the second conveyor 78 by the robotic arm 114. The robotic arm 114 picks up the tire 54 and rim 100 with pincers (not shown). The tire 54 and rim 100 are placed inside a first vacuum chamber 10 and the first vacuum chamber 10 is evacuated by a roughing pump 14 and hi-vac pump 16. At a predetermined vacuum pressure, the helium gas spectrometer 30 is exposed to the first vacuum chamber 10 and measures the amount of helium leaking from the tire 54 and rim 100. Based on this leak rate, the tire 54 and rim 100 are then accepted and placed on the third conveyor 44, or rejected and placed on the fourth conveyor 46.

It should be noted that the current invention has been described in the preferred embodiment as using two tire 54 and rim 100 sizes. The need for two sizes is common in cases such as lawn mowers (not shown) that use a larger rear tire 54 and smaller front tire 54. Obviously, the invention could be modified, using sound engineering judgment, to include as many different size tires as desired.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

I claim:

1. A tire inflater machine for use in inflating associated first and second tires to associated first and second rims respectively, the associated first and second tires having different sizes and the first and second associated rims having different sizes, the tire inflater machine comprising:

a source of inflation gas;

an inflation head including first and second inflation chambers, the first inflation chamber for use in inflating the first associated tire to the first associated rim, the second inflation chamber for use in inflating the second associated tire to the second associated rim;

sensing means for sensing the size of the first and second associated rim; and, chamber adjusting means for selectively adjusting the inflation head to operate with the first inflation chamber or the second inflation chamber.

2. The tire inflater machine of claim 1, wherein the sensing means are photo switches.

3. The tire inflater machine of claim 1, wherein the inflater machine further comprises securing means for securing the rim while the sensing means senses the size of the first and second associated rims.

4. The tire inflater machine of claim 3, wherein the securing means is a clamp with multiple grooves corresponding to the size of the first and second associated rims.

5. The tire inflater machine of claim 1, wherein the first inflation chamber is downwardly extendable from the second chamber.

6. The tire inflater machine of claim 5 wherein the inflation head comprises:

a bell weldment;

a first chamber flange forming the first inflation chamber, the first chamber flange being selectively moveable with respect to the bell weldment; and, a second chamber flange forming the second inflation chamber, the second chamber flange being operatively connected to said bell weldment.

7. The tire inflater machine of claim 6 wherein said first and second chamber flanges are axially aligned and wherein said first chamber flange is selectively moveable within said first chamber flange.

8. The tire inflater machine of claim 1, wherein the inflater machine further comprises a linear transducer for use in measuring the height of the inflation head.

9. The tire inflater machine of claim 8, wherein the linear transducer further comprises:

determining means for determining where the inflation head is located; and, a shut-off device for shutting off the inflater machine when the associated tire is inflated.

10. The tire inflater machine of claim 9, wherein the determining means is a magnetic ring.

11. The tire inflater machine of claim 9, wherein the shut-off device is a programmable logic controller.

12. A method for inflating associated first and second tires to associated first and second rims respectively with a tire inflater machine, the associated first and second tires having different sizes and the first and second associated rims having different sizes, the tire inflater machine including an inflation head including first and second inflation chambers, the method comprising the steps of:

sensing the size of the first associated rim;

adjusting the inflation head to operate with the first inflation chamber; and, inflating the first associated tire to the first associated rim.

13. The method of claim 12 further comprising the steps of:

sensing the size of the second associated rim;

adjusting the inflation head to operate with the second inflation chamber; and, inflating the second associated tire to the second associated rim.

14. The method of claim 12, wherein the step of sensing the size of the first associated rim comprises the step of:

switching photo switches.

15. The method of claim 12, after inflating the first associated tire to the first associate rim, the method further comprises the steps of:

determining the height of the inflation head with a magnetic ring; and, shutting off the inflater machine when the inflation head reaches a predetermined height.

* * * * *